June 17, 1941.   W. O. KELLY ET AL   2,245,680
ROTARY CURVE GREASER
Filed April 4, 1939
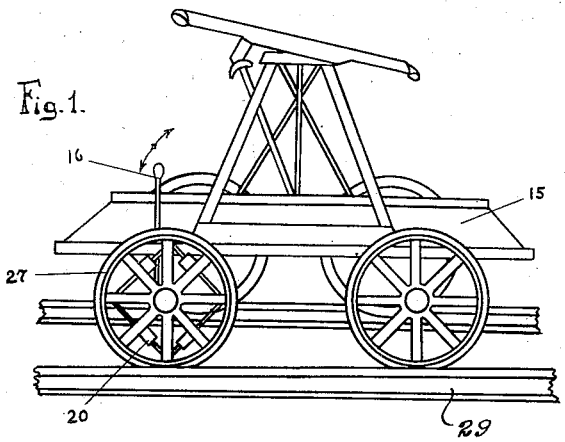
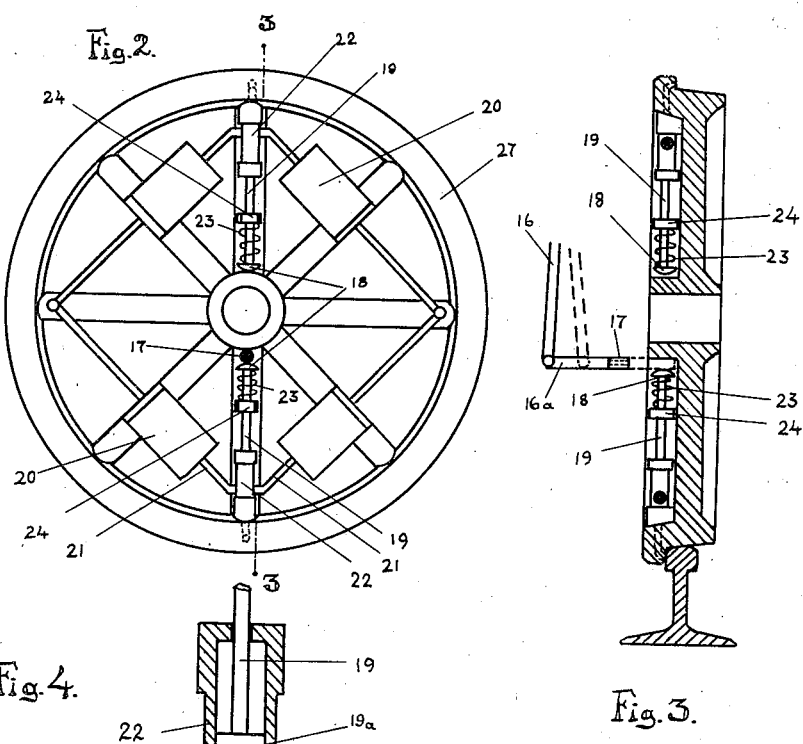
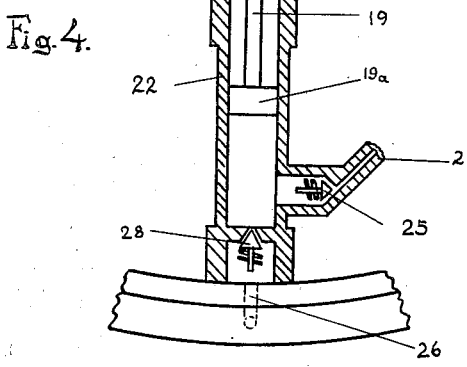
Inventors:
William O. Kelly.
Gerald W. Griffin.
By: E. J. Fetherstonhaugh
Attorney.

Patented June 17, 1941

2,245,680

UNITED STATES PATENT OFFICE 2,245,680

ROTARY CURVE GREASER

William Orlando Kelly, Annapolis Royal, Nova Scotia, and Gerald Walter Griffin, Kentville, Nova Scotia, Canada, Application April 4, 1939, Serial No. 265,958

4 Claims. (Cl. 184—3)

The invention relates to a rotary curve greaser, as described in the present specification and illustrated in the accompanying drawing that forms part of the same.

The invention consists essentially in a plurality of lubrication boxes preferably radially situated in the wheel of a handcar and similarly a plurality of grease tanks feeding these boxes.

The objects of this invention are to lubricate the rails and particularly the curves of the rails and thereby eliminate to a large extent scraping and screeching and the accompanying friction that will necessarily retard the progress of the train, to avoid the breaking of the material through the fierce contact of the wheel flanges on the rails and generally to economize in the maintenance of the road.

In the drawing,

Figure 1 is a perspective view of a handcar showing the lubrication boxes and grease tanks applied to one of the wheels.

Figure 2 is an enlarged elevational view of the handcar wheel.

Figure 3 is a sectional view on the line 3—3 in Figure 2.

Figure 4 is an enlarged fragmentary view of a lubrication box partly in section.

Like numerals of reference indicate corresponding parts in the various figures.

Referring to the drawing, the handcar 15 has the lever 16 and which projects through the deck of the car and is provided with a pivoted offset end 16a. The roller 17 is journalled on the offset end 16A, and is adapted to engage one or other of the cams 18 that are mounted on the outer ends of the piston rods 19. These piston rods have the collars 24 and the springs 23 encircling the piston rods and have one end engaging with the collar 24 and the other end engaging with the cams 18. The piston rods have the piston heads 19A located within the lubrication boxes 22, the latter having the passages 21 connected to the grease tanks 20 and the passages 26 leading to the rim of the wheel 27. The spring held valves 25 and 28 are located within the passages 21 and 26 for allowing the grease to enter and leave the lubrication boxes 22.

In the operation of this invention, when it is desired to lubricate a track, the lever is manually operated, which brings the roller, which is connected to the lever, into engagement with one or other of the cams that are mounted on the plunger rods, and this has the effect of causing one or other of the plunger rods to open the valve 28 located in the passage 26 of the lubrication box, and thereby allowing the lubrication to flow through the passage 26 on to the rail 29, and at the same time the valve 25 will close the passage 21 from the lubricating tank to the lubrication box, and the back stroke of the piston will close the valve 28 and open the valve 25 so that a new supply of lubrication will flow into the lubrication box, and be ready for the next operation, which will occur at every half turn of the wheel. It will therefore be seen that a set of lubrication means to the individual wheel is very important, because when the lever and its accompanying roller is brought into operation, it will engage with either one or the other of the set of lubricating means and thereby facilitate quick and very efficient method of applying the grease or other lubrication to the track.

It will be seen that this invention furnishes a very practical way of greasing the rails and particularly the curved rails, and it is as well very economical in the maintenance of the railroad.

What we claim is:

1. In a rotary curve greaser, a wheel, a plurality of lubrication boxes secured to said wheel and having passages extending therethrough, a plurality of lubrication tanks secured to said wheel, and having common passages to said lubrication boxes, and means for controlling the flow of lubrication from the tanks into the said lubrication boxes and thereafter on to the rail.

2. In a rotary curve greaser, a wheel, a pair of lubrication boxes secured to said wheel and arranged opposite to one another adjacent to the circumference of the wheel, and having passages extending through said wheel, a set of lubrication tanks connected to each of said lubrication boxes and having common passages therewith, piston rods extending from said lubrication boxes and terminating in cams, and the means for engaging with one or other of said cams.

3. In a rotary curve greaser, a wheel, a plurality of lubrication boxes radially situated and secured to said wheel, a set of lubrication tanks for each of said lubrication boxes, and having communicating passages therewith, pistons in said boxes having rods extending centrally therethrough and terminating in cams, and a lever having a roller at its lower end adapted to engage with one or other of said cams.

4. In a rotary curve greaser, a wheel, a plurality of lubrication boxes radially situated and secured to said wheel, a set of lubrication tanks for each of said lubrication boxes, and having communicating passages therewith, pistons in said boxes having rods extending centrally therethrough and terminating in cams, a lever having a roller at its lower end adapted to engage with one or other of said cams, and a valve mechanism located in the passages of said lubrication boxes and said lubrication tanks and operated by said pistons, and adapted to open and close the feed of lubrication from said tanks to said lubrication boxes, and from said boxes to the rail to be lubricated.

WILLIAM ORLANDO KELLY.
GERALD WALTER GRIFFIN.